3,263,761
APPARATUS FOR DISPENSING PREDETERMINED WEIGHTS OF A PLURALITY OF DIFFERENT LIQUID OR GRANULAR MATERIALS
Campbell Dean Boadle, Caerleon, and David Warwick Lloyd Clamp, Guisborough, England, assignors to Joseph Lucas (Industries) Limited, Birmingham, England
Filed June 28, 1965, Ser. No. 467,575
Claims priority, application Great Britain, Mar. 16, 1962, 10,106/62
14 Claims. (Cl. 177—70)

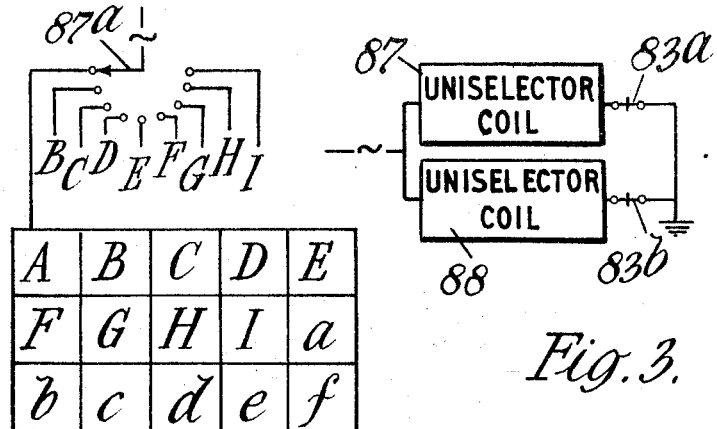
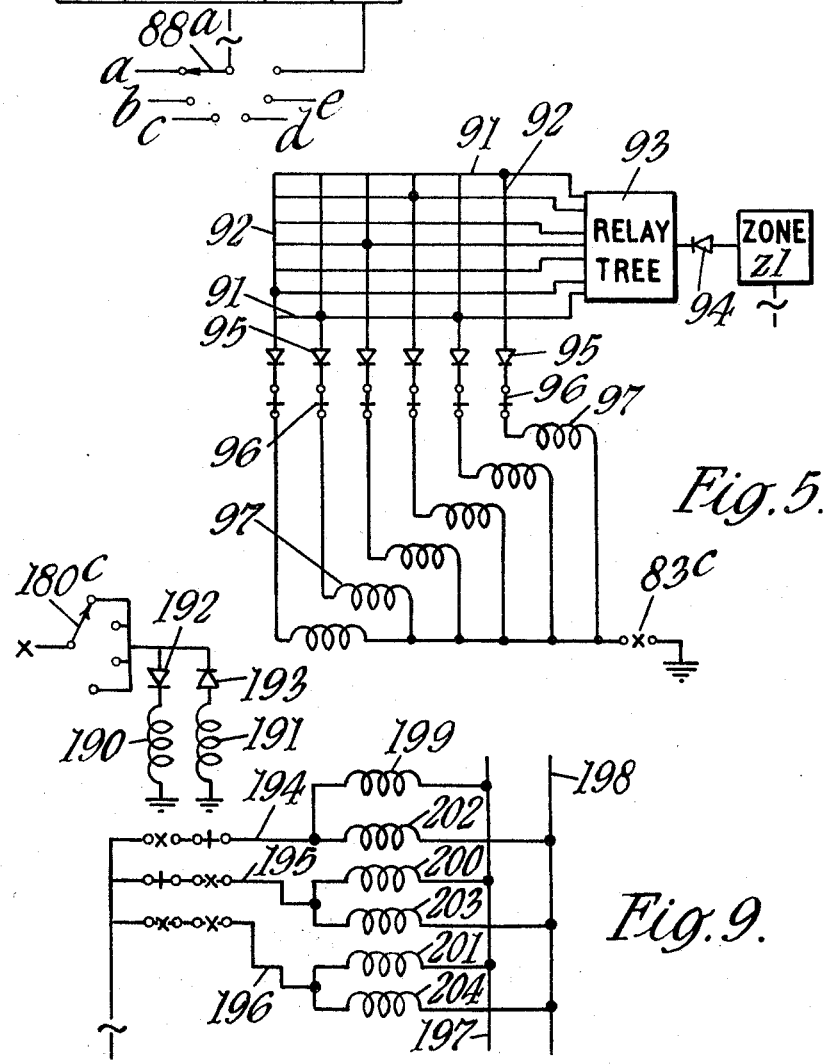
Fig. 3.
Fig. 5.
Fig. 9.

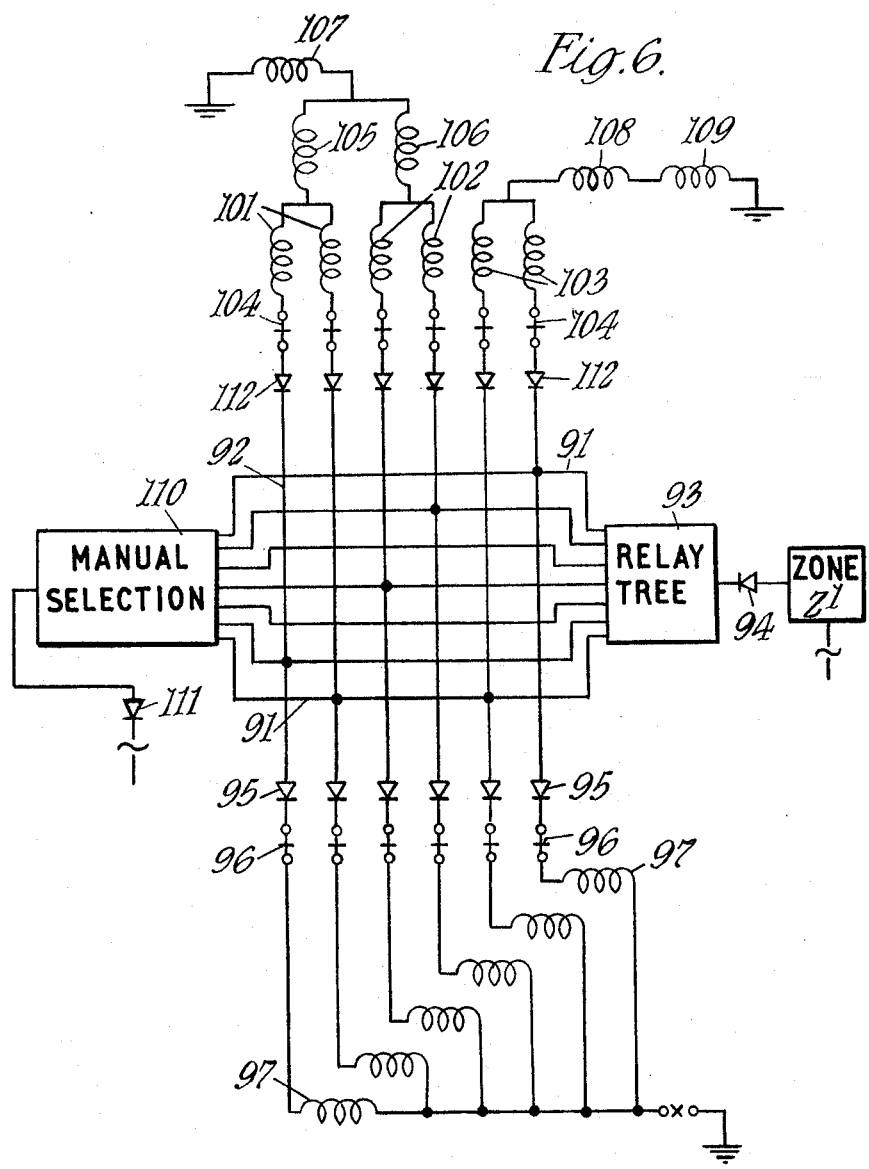

This invention relates to apparatus for dispensing predetermined weights of a plurality of different liquid or granular materials, and is a continuation-in-part of our abandoned application No. 262,772 filed March 4, 1963.

An example of the invention is illustrated in the accompanying drawings, in which:

FIGURE 3 illustrates part of the circuit associated with a punched card reader employed in the dispenser;

FIGURE 5 illustrates a device used to ensure that the correct valves are opened when material is discharged;

FIGURE 6 is similar to FIGURE 5, but illustrates a device used in discharging and filling the minor containers;

FIGURE 9 shows a circuit for opening valves to transfer material between conveyors.

*Mechanical arrangement*

Figure 1:
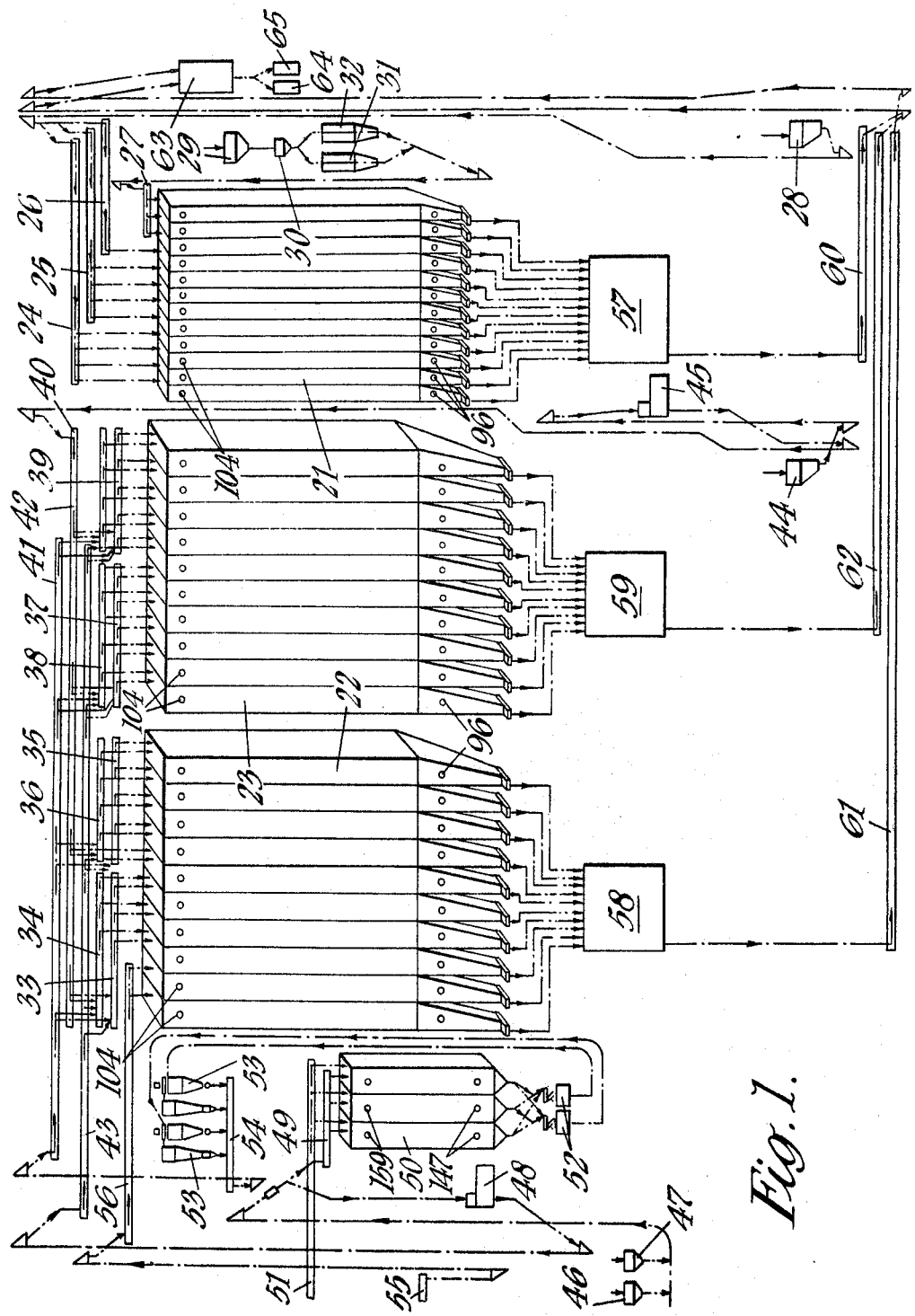
FIGURE 1 is a diagrammatic view showing the mechanical arrangement of the dispenser.

The mechanical arrangement of the apparatus is illustrated in FIGURE 1, in which there is shown a bank of minor storage containers 21, and two banks of major storage containers 22, 23. Material can be delivered to the containers 21 by way of conveyors 24, 25, 26, 27 of the kind including a plurality of normally closed flaps each of which can be opened to permit delivery to a particular container. There are two inputs to the container 21, these inputs being constituted by the hoppers 28, 29. Material is conveyed directly from the hopper 28 to the conveyors 24, 25, 26 but material from the hopper 29 is fed to weighing apparatus 30 and thence to one or other of a pair of mixing units 31, 32. The outputs from these units are conveyed to the conveyor 27, so that, as shown, three of the containers 21 are filled with premixed constituents.

Material is delivered to the containers 22, 23 by way of conveyors 33, 34, 35, 36, 37, 38, 39, 40 arranged above the containers as shown, and themselves supplied with material by three further conveyors 41, 42, 43.

The conveyor 42 is supplied with material from a hopper 44 by way of a separator 45 which serves to separate unwanted constituents. The conveyor 43 is similarly supplied from a pair of hoppers 46, 47 by way of a separator 48. The hoppers 46, 47 also supply material to a conveyor 49 which feeds into containers 50, the containers 50 receiving further material from a conveyor 51. The output from the container 50 is fed to grinders 52, and is then lifted by pneumatic cylinders 53 onto a conveyor 54, from whence it is conveyed to the conveyor 41.

A further input to certain of the containers 22 is provided by way of conveyors 55, 56. However, whereas all the other intakes to the containers 21, 22, 23 are controlled in a manner to be described, there is no control over the inputs from the conveyors 55, 56.

The outputs from the containers 21, 22, 23 are fed to mixing and weighing units 57, 58, 59 which weigh predetermined quantities of material from one or more of each set of containers in a manner to be described. When the correct weights have been delivered, the outputs from the units 57, 58, 59 are fed to conveyors 60, 61, 62 respectively, and from these conveyors are fed to a mixer 63, the output from which is fed to one or other of a pair of stores 64, 65.

*Weighing apparatus*

Figure 2:
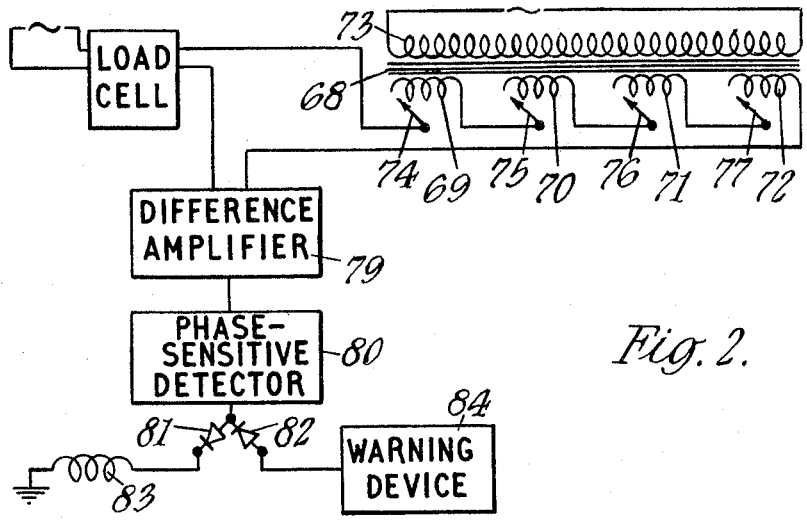
FIGURE 2 is a circuit diagram illustrating the form of weighing apparatus used in the dispenser.

The general form of the weighing apparatus employed is shown in the accompanying FIGURE 2. Referring to FIGURE 2, there is provided a transformer 68 having four secondary windings 69, 70, 71, 72 and a common primary winding 73 which may, however, be replaced by four separate primary windings fed from a common supply. The windings 69, 70, 71, 72 have associated therewith wipers 74, 75, 76, 77 respectively whereby the total output of the transformer secondary can be adjusted to be a proportion of the output of each of the four secondary windings. Moreover, the four secondary windings represent different proportions of the secondary output, a typical arrangement being such that the output from the winding 69 is equivalent to the output when a weight of ten pounds is placed on a load cell 78, the wiper 74 providing ten steps of one pound each. Similarly the steps on the winding 70, 71, 72 are in units of ten pounds, one hundred pounds and one thousand pounds respectively.

The load cell 78 is subjected to the weight to be measured and is connected to the same A.C. supply as the transformer 68, so that the outputs from the load cells and the transformer secondary are in phase. These outputs are fed to and subtracted by a difference amplifier 79 the output from which is fed to a phase-sensitive detector 80. The output from the amplifier has a phase dependent on which of the input signals thereto is greater, and the detector 80 is arranged to produce a positive or negative output when the signal from the transformer secondary is the larger or smaller respectively. The positive and negative signals are separated by diodes 81, 82 and used to operate a relay 83 and a warning device 84 respectively.

The operation is as follows: the required weight is indicated by the position of the wipers 74, 75, 76, 77 which constitute a variable voltage source. The apparatus is then switched on. Initially, there is no output from the load cell 78, and the relay 83 is energised, thereby initiating delivery of the material to be weighed to a container with which the load cell 78 is associated. When the required weight has been delivered, the output from the amplifier 79 becomes zero and the relay 83 is de-energised to cease delivery of material. If too much material is inadvertently delivered, the warning device 84 is operated.

Referring now to FIGURE 1, the units incorporating weighing apparatus as above described are those designated 30, 57, 58 and 59. In the weigher 30, the wipers 74, 75, 76, 77 are set manually to the desired weight at times when it is desired to deliver material to one of the mixing units 31, 32. However, the wipers associated with the units 57, 58, 59 are automatically set in accordance with the reading of a punched card in a manner to be described.

*Discharge of material from major and minor containers*

Figure 4:
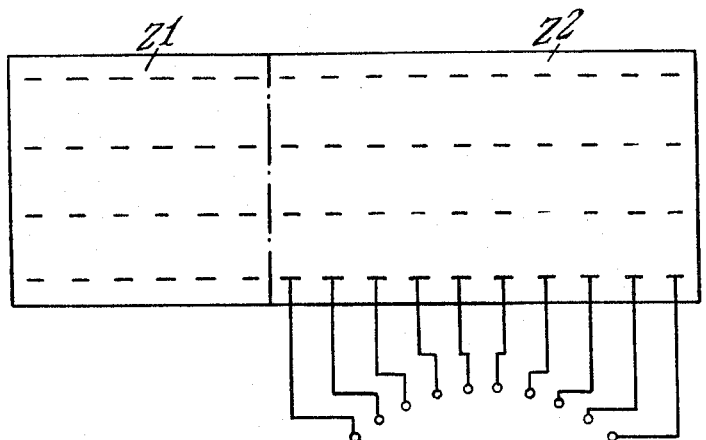
FIGURE 4 illustrates in greater detail part of the electrical circuit associated with one section of the punched card.

Although two sets of major containers 22, 23 are employed, in practice they can be considered as a single set of containers, a single weighing apparatus being in practice incorporated with the units 58, 59. The recipe of ingredients which are to be delivered to the mixer 63 is determined by a punched card the nature of which is illustrated in FIGURES 3 and 4. A card is illustrated in FIGURE 3 having nine sections representing nine ingredients which can be taken from the major containers and mixed, and six sections representing six ingredients which can be taken from the minor containers and mixed. The major and minor ingredients are denoted by capital and small letters respectively. The nature of each section of the card is illustrated more clearly in FIGURE 4, where the section is seen to be divided into two zones Z1, Z2. The zone Z1 contains information regarding the material required (but not the container in which the material is stored), whilst the zone Z2 contains information regarding the weight of material required.

Considering first the weighing of the major materials, and referring to FIGURE 4, the zone Z2 has four rows each having ten positions in which a hole can be punched, the four rows representing respectively pounds and tens, hundreds and thousands of pounds. As shown, each position on the thousands row is connected to one terminal on a bank traversed by a wiper 85a of a uniselector 85. The uniselector 85 has nine wipers such as 85a moving over banks associated with thousands columns in the sections A to I. Moreover, the nine wipers 85a are connected in series with a relay 86 having a normally closed contact 86a in series with the uniselector 85.

The wiper 85a which is effective is dependent upon which of the sections A to I is energised. This in turn depends upon the position of a wiper 87a operable by a uniselector 87. Initially, the wiper 87a energises section A. The uniselector 85 is now operated and is of the kind which steps continuously until its circuit is broken. The wiper 85a is thus stepped until a hole appears in the thousands column in section A, at which point the relay 86 is energised to open contact 86a and stop the uniselector 85. The uniselector 85 also operates the wiper 77 in the weighing apparatus associated with the major containers, so that this wiper is now correctly set.

Whilst the uniselector 85 is operating, three other uniselectors and associated components are scanning the other three rows of zone Z2 in section A, so that all the wipers 74, 75, 76, 77 are correctly set to indicate the required weight of the first ingredient (i.e.), the ingredient represented by section A. Simultaneously, the zone Z1 of section A is being scanned in a manner to be described to determine which valves associated with the major containers are to be opened to discharge material into the units 58, 59.

When the variable voltage source constituted by the wipers 74, 75, 76, 77 is correctly set, the weighing apparatus operated after a short delay which is provided by arranging for a switch to be closed only when all the uniselectors for operating the wipers 74, 75, 76, 77 have stopped. When the weighing apparatus operates, the relay 83 is energised to permit opening of the predetermined valves and to open a contact 83a in series with the uniselector 87. When the required weight of the first ingredient has been delivered, the relay 83 is de-energised, and the resulting closing of contact 83a steps uniselector 87 once so that section B is now energised and section A is de-energised. As soon as section A is de-energised, a circuit is no longer completed to the relay 86, and so the contact 86a closes and the uniselector 85 operates to move its nine wipers 85a as previously explained. The wiper 85a which is effective is now the one moving over the zone Z2 of section B, because only section B is energised. The uniselector 85 continues to operate until a hole appears in the thousands column in zone Z2 of section B, at which point the relay 86 is again energised to open the contact 86a and stop the uniselector 85. Moreover, while the uniselector 85 is operating, the three other uniselectors previously mentioned are also operating to scan the other three rows of zone Z2 of section B, and when all four uniselectors have stopped the wipers, 74, 75, 76, 77 will be set to indicate the weight represented by the holes punched in zone Z2 of section B. This weight represents the sum of the weight of the first ingredient already delivered plus the required weight of the second ingredient (i.e., the ingredient represented by section B). Thus if the requirements of the first and second ingredients are 1063 lbs. and 1256 lbs., zone Z2 of section A is punched to represent 1063 lbs., and zone Z2 of section B is punched to represent 2319 lbs.

When the wipers 74, 75, 76, 77 are set in accordance with section B, the weighing apparatus operates again after the short delay already mentioned. On operation of the apparatus, relay 83 is energised to permit opening of the appropriate valves for delivering the second ingredient. Delivery of the second ingredient continues until the cumulative weight of material delivered is 2319 lbs. Relay 83 is then de-energised. Uniselector 87 is now stepped to de-energise section B and energise section C, and the operation continues for delivery of the third ingredient in exactly the same way as described above. It will be appreciated that if 2515 lbs. of the third ingredient are required, section C is punched to represent the cumulative weight (i.e.), 4834 lbs. After the third ingredient has been delivered, the fourth and further ingredients are delivered in precisely the same way in successive cycles of operation of the apparatus. Thus, the load cell produces a first signal representing the weight of material in the main container and the variable voltage source 74, 75, 76, 77 produces a second signal representing the desired weight of material. When the first and second signals become equal, the punched card reader is operated as explained to cause it to scan a further section of the punched card and to re-set the variable voltage source in the manner indicated so that the second signal represents the weight of material delivered plus the desired weight of the next material to be delivered.

The operation of dispensing materials from the minor containers is essentially similar to the described above, the sections A to F being scanned by a wiper 88a operable by a uniselector 88 in series with a relay contact 83d.

In order to ensure that the valves associated with the correct major or minor containers are open, a device as shown in FIGURE 5 is employed. As shown in FIGURE 5, the device comprises a plurality of input lines 91 and a plurality of output lines 92 intersecting the input lines. Each of the lines 92 has a connector associated therewith whereby it may be connected to any of the lines 91, and it will thus be appreciated that any input line 91 can be connected to one or more output lines 92, but no output lines 92 can be connected to more than one input line 91.

During the period when a zone Z2 of a section is scanned, the corresponding zone Z1 is also scanned and provides a signal to a relay tree 93, a diode 94 being included so that positive signals only are used. The relay tree 93 energises one of the lines 91, it being understood that the lines 91 represent materials. The positions of the connectors guide the signal to the appropriate line 92, the signals on the lines 92 passing through diodes 95 and normally closed contacts 96 to actuate the valve operating solenoids 97 for controlling the flow from the containers. Operation of the solenoids is dependent upon closing of a contact 83c of the relay 83.

The contacts 96 are shown also in FIGURE 1. They are opened when the level in a container falls below a predetermined value, and may if desired be used to give an indication that the level has fallen below this value.

It will be noted that in FIGURE 5 there are two lines 91 which are not connected to output lines 92, this indicating that certain materials are not being used. Moreover, the material represented by one of the lines 91 is contained in two containers, and hence this line 91 is connected to two of the lines 92.

Input to minor containers

FIGURE 5 illustrates the general principle of the device used to equate material requirements with the appropriate containers. This device can be used in filling the minor containers as well, as is illustrated in FIGURE 6, wherein parts corresponding to those seen in FIGURE 5 have been designated with similar reference numerals. In FIGURE 6, there is shown for simplicity the means for feeding material to two of each of the containers fed by the conveyors 25, 26, 27. The conveyors 25, 26, 27 are of known form, material fed to a conveyor being traversed continuously in a closed path unless a valve in the base of the conveyor is open, in which case material is delivered to the container with which the valve is associated. In FIGURE 6 the relays 101 serve respectively to operate two valves associated with the conveyor 25, whilst the relays 102, 103 operate valves associated with the conveyors 26, 27 respectively. The contacts 104, which are shown also in FIGURE 1 open when the respective containers are nearly full and thereby prevent material being delivered to a filled container.

The relays 105, 106 serve when energised to start the conveyors 25, 26 and to establish communication between the conveyors 25, 26 respectively and the main conveyor from the hopper 28, the operation of the latter conveyor being commenced by relay 107. Similarly, the relays 108, 109 initiate operation of the conveyor 27 and the conveyor from the mixing units 31, 32.

A manual selection device 110 is provided for feeding signals to the appropriate lines 91 when further quantities of material are to be delivered to the minor containers. It will be seen that the diode 111 ensures that only negative signals are used, and the diodes 112 conduct the negative signals. The employment of the diodes 94, 95, 111, 112 permit simultaneous delivery to and feeding from containers.

Input to major containers

In FIGURE 6, material represented by one line 91 is stored in two containers and both containers are replenished simultaneously. However, in practice it is required that any major containers in which the same material is stored shall always be filled one at a time, and moreover that if one filling operation ends with a certain container partly filled, the next filling operation with the same material should start at that container. In this way the time during which a material is stored in a container is reduced.

Figure 7:
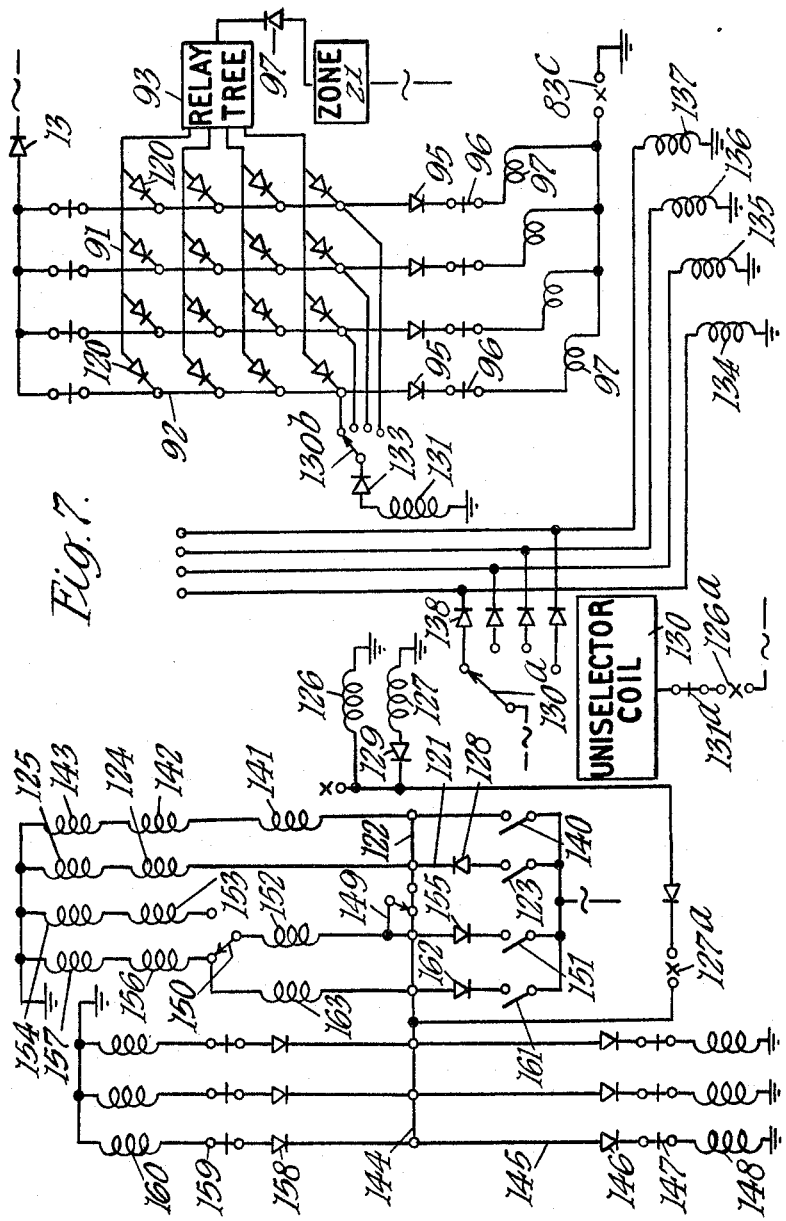
FIGURE 7 illustrates part of a circuit used in discharging and charging the minor containers.

In order to meet these requirements, a more complex version of the circuit shown in FIGURE 6 is employed, this circuit being shown in part in FIGURE 7. For simplicity four different materials are considered, and the description is confined to four of the containers 22 immediately below the conveyors 35, 36 (FIGURE 1).

The part of FIGURE 7 applicable to the discharge of material from the major containers is similar to that shown in FIGURE 5, except that the possible connecting points between the lines 91, 92 are connected to the lines 92 through diodes 120.

The operation of the circuit to deliver material to a major container can be considered in four stages. It will be appreciated that in the diagram the set of components associated with one material only is shown.

Input from hopper 44

Suppose a consignment of material is to be delivered to the appropriate major containers from the hopper 44. The line 121 (FIGURE 7) is connected to a line 122 representing the material in the hopper 44, a device similar to that shown in FIGURE 5 being used for this purpose. The switch 123 is now closed to energise relays 124, 125. Relay 125 operates the conveyor 42, whilst relay 124 operates the elevating system from the hopper 44 to the conveyor 42.

Closing of the switch 123 also results in energisation of a relay 126, but a further relay 127 is not now energised because of the opposite connections of the diodes 128, 129.

Energisation of the relay 126 results in closing of contact 126a, so that a uniselector 130 is energised to step its wipers 130a, 130b. Stepping continues until the wiper 130b is connected to a line 92, at which point a relay 131 is energised through diodes 132, 133. The resultant opening of contact 131a stops the uniselector 130. At this stage one of four relays 134, 135, 136, 137 is energised and operates in a manner to be described to open the appropriate valves in one of the conveyors 35, 36. It will be appreciated that the relays 134 to 137 are common to the components used for identifying the various different materials, and isolating diodes 138 are associated with each of the wipers such as 130a.

Input from grinders 52

The input from the grinders 52 is similar to that from the hopper 44, a switch 140 being closed to energise relays 141, 142, 143. Relay 141 starts the grinders 52, relay 142 operates the elevating system from the grinders to the conveyor 41, and relay 143 operates the conveyor 41. In addition, relay 127 is energised to close contact 127a so that positive signals are supplied through a diode 145 to the line 144. The line 144 is one of a plurality of similar lines corresponding to different materials, and which are connectible through a device such as that shown in FIGURE 5 to one of a number of lines 145. A positive signal on a line 145 can flow through a diode 146 and a low level contact 147 to energise a relay 148 for permitting discharge from a container 50 to the grinders 52.

Input from hoppers 46, 47

The input from the hoppers 46, 47 can be fed either to the appropriate major containers or alternatively to the containers 50. For this purpose two ganged two-position switches 149, 150 are provided. When these switches are in positions opposite to those shown and the switch 151 is closed relays 152, 153, 154 are energised. Relays 152, 153 operate the two parts of the elevator system between the hoppers 46, 47 and the conveyor 43, which is operated by the relay 154. The relay 127 is also energised, but has no effect since negative signals flowing through the diode 155 cannot pass through the diode 145. However energisation of the relay 126 causes the circuit to operate as described with reference to the input from the hopper 44.

With the switches 149, 150 in the position shown, relays 152, 156, 157 are energised. Relays 152, 156 operate the elevator system from the hoppers 46, 47 and the conveyor 49, which is operated by the relay 157. A negative signal fed between lines 144, 145 can flow through a diode 158 and high level contact 159 to operate a relay 160 to control the valves associated with the conveyor 49.

Input from conveyor 51

The input from the conveyor 51 is to the containers 50 only. A switch 161 is closed, and negative signals flow through diode 162 to operate the appropriate relay 160, which controls the valves in the conveyor 51 as well as the conveyor 49. Operation of the conveyor 51 is initiated by a relay 163.

Delivery from main conveyors to containers

Figure 8:
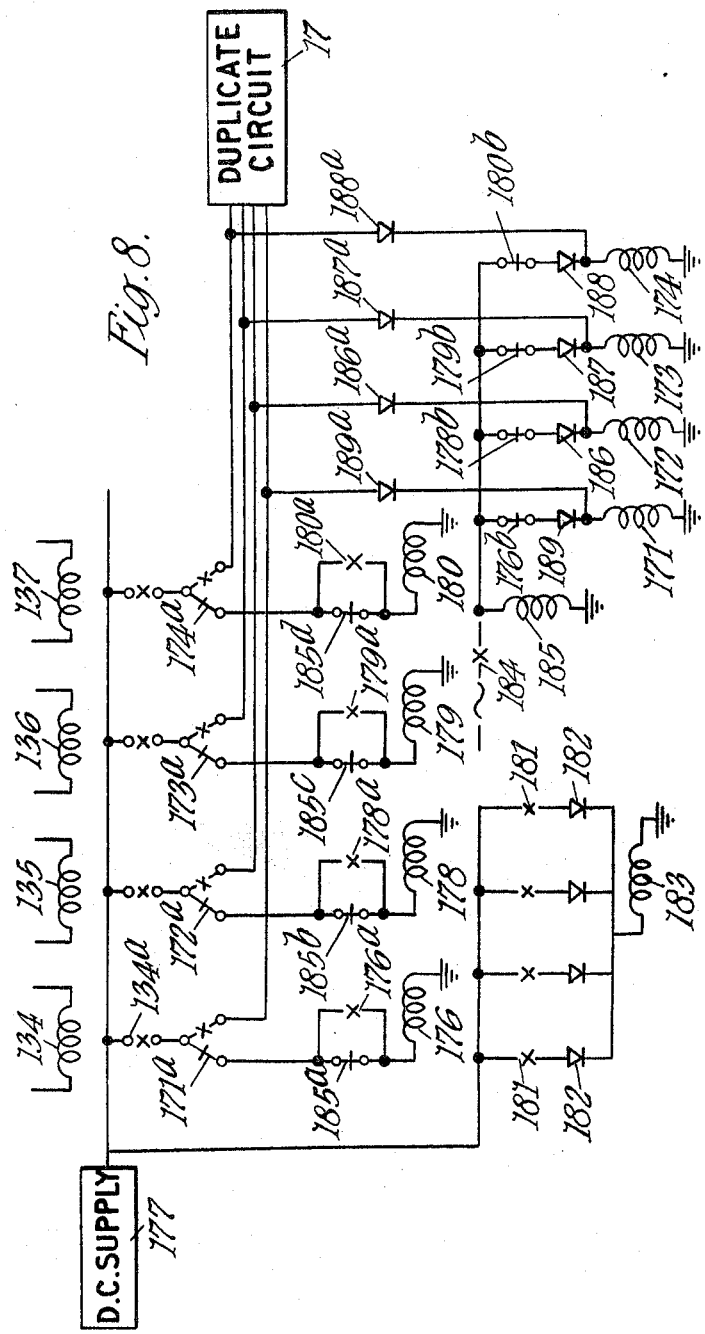
FIGURE 8 illustrates a circuit for operating valves in the conveyors above the major containers.

The description so far deals with feeding material to one of the main conveyors 41, 42, 43. FIGURE 8 illustrates the circuit for determining which of the conveyors 35, 36 (the operation of these two conveyors only being considered for simplicity) is to deliver material to the appropriate container. Which of the conveyors 35, 36 is employed depends upon the position of changeover switches 171a, 172a, 173a, 174a operable by relays 171 to 174 respectively. The switches 171a to 174a occupy the position shown unless the conveyor 35 is in use, in which case they are moved to their alternative position. The circuit controlled by the switches 171a to 174a in their alternative position is indicated at 175 and is a duplicate of the circuit now to be described.

Assuming that the relay 134 is energised to indicate that delivery to a certain container is required, and that the conveyor 35 is available, the operation is as follows. Relay contact 134a is closed to energise a relay 176 from a D.C. supply 177, and thereby close the hold-on contact 176a and open a contact 176b in series with the relay 171. The operation is similar when relays 135, 136, 137 are energised, the relay 178, 179, 180 corresponding to the relay 176. The relays 176, 178, 179, 180 close contacts which cause operation of the appropriate valve.

As soon as a chosen valve is open, it operates one of the four contacts 181, so that current flows through one of the diodes 182 to energise a relay 183 which starts the conveyor 35. As soon as the conveyor 35 starts, it closes a switch 184 which results in energisation of a relay 185 which opens contacts 185a to 185d in series with the relays 176, 178, 179, 180 respectively. The relays 178, 179, 180 cannot now be energised, but the relay 176 is held on by its contact 176a.

Closing of switch 184 also energises relays 172, 173, 174 through diodes 186, 187, 188, and thereby changes over the contacts 172a, 173a, 174a. The relay 171 cannot be energised through diode 189 since contact 176b is open.

If now it is required to deliver material to one of the four containers other than the container controlled by the relay 134, the circuit 175 will be operative and the conveyor 36 is utilised. If both conveyors 35, 36 are in use, nothing happens and a warning indication is given by any convenient means.

The diodes 186 to 189 and the equivalent diodes 186a to 189a in the circuit 175 ensures that if the conveyor 36 is in use and the conveyor 35 becomes available, the operation is not switched to the conveyor 35.

Turning now to FIGURE 9, the circuit there shown determines which of the conveyors 35, 36 is to be fed with material supplied to one of the main conveyors 41, 42, 43. A tapping is made from a point X in FIGURE 7 and applied to a wiper 140c which moves over a plurality of contacts representing the containers. The four contacts shown represent the four containers being described, and are interconnected and earthed through relays 190, 191 in series with oppositely acting diodes 192, 193 respectively.

The signal applied to the point X will be positive, negative or A.C. when the conveyors 42, 43, 41 are employed, so that one or both of the relays 190, 191 will be energised to operate the three contacts shown immediately below their respective relays. It will be seen that signals on the lines 194, 195, 196 represent use of the conveyors 42, 43, 41 respectively.

A conductive path is provided by way of the lines 197, 198 respectively when the conveyors 35, 36 are in use. Thus with conveyor 35 in use, one of the relays 199, 200, 201 will be energised to set a route to the conveyor 35 from the conveyors 42, 43, 41 respectively. When conveyor 36 is in use, relays 202, 203, 204 serve a similar purpose. It will be understood that a circuit as shown in FIGURE 9 is provided for each line 122.

If desired, two or more punched card readers can be used for scanning two or more cards which correspond to two or more main products to be mixed. Moreover, although in the example described valves are used to control discharge from the containers, other discharge means such, for example, as screw feeders, could be employed.

Having thus described our invention what we claim as new and desire to secure by Letters Patent is:

1. Apparatus for dispensing predetermined weights of a plurality of different materials, comprising in combination a plurality of storage containers within which the different materials are stored respectively, a main container to which material from the storage containers can be fed, a plurality of discharge means controlling flow from the storage containers respectively to the main container, electrical weighing means for producing a first signal of magnitude dependent on the weight of material in the main container, a punched card reader capable of scanning sections of a punched card in turn, a variable voltage source producing a second signal, means operable by said punched card reader for adjusting said second signal in accordance with information on a section of a punched card being scanned, whereby said second signal represents a desired weight of material, a difference amplifier to which said first signal and said second signal are fed, a master relay energisable by the output from the difference amplifier when the second signal exceeds the first signal, a plurality of discharge relays which when energised operate said discharge means respectively, a normally open contact in series with each of said discharge relays and operable by the master relay, means operable by information on the section of the punched card being scanned for energising a discharge relay through the appropriate contact of the master relay to permit delivery of material from a selected storage container to the main container, delivery terminating when the first and second signals become equal, means operable when the first and second signals become equal for operating the punched card reader to cause it to scan a further section of the punched card, said reader re-setting said variable voltage source so that the second signal has a value representing the weight of material in the main container plus the desired weight of the next material to be delivered to the main container, so that the setting of the variable voltage source becomes cumulatively greater as successive sections of the punched card are scanned and the appropriate materials delivered to the main container, a switching device whereby information obtained from a section of the punched card and representing the material required can be converted to information indicating the containers within which the material is stored, said switching device including a plurality of input lines representing the plurality of different materials respectively and energisable in accordance with information on the punched card, a plurality of output lines crossing the input lines but out of contact therewith, the output lines being in series with the discharge relays respectively, and a plurality of connecting pieces associated with the output lines respectively and connectible to any of the input lines, whereby no two input lines can be connected to the same output line, but an input line can be connected to more than one output line if the same material is stored in more than one container, the apparatus further including a conveying system for feeding material from one or more stations to the container or containers in which the material is to be stored, a plurality of intake valves above the containers respectively, a plurality of intake relays in series with said output lines for operating the intake valves respectively, a plurality of diodes in series with said output lines whereby signals of one polarity only can be fed to the intake relays, a further plurality of diodes in series with the output lines whereby signals of the opposite polarity only can be fed to said discharge relays, and means including further diodes whereby information fed to the input lines for the purpose of effecting intake to and discharge from said containers, consists of signals of said one and said opposite polarity respectively.

2. Apparatus for dispensing predetermined weights of a plurality of different materials, comprising in combination a plurality of storage containers within which the different materials are stored respectively, a main container to which material from the storage containers can be fed, a plurality of discharge means controlling flow from the storage containers respectively to the main container, electrical weighing means for producing a first signal of magnitude dependent on the weight of material in the main container, a punched card reader capable of scanning sections of a punched card in turn, a variable voltage source producing a second signal, means operable by said punched card reader for adjusting said second signal in accordance with information on a section of a punched card being scanned, whereby said second signal represents a desired weight of material, a difference amplifier to which said first signal and said second signal are fed, a master relay energisable by the output from the difference amplifier when the second signal exceeds the first signal, a plurality of discharge relays which when energised operate said discharge means respectively, a normally open contact in series with each of said discharge relays and operable by the master relay, means operable by information on the section of the punched card being scanned for energising a discharge relay through the appropriate contact of the master relay to permit delivery of material from a selected storage container to the main container, delivery terminating when the first and second signals become equal, means operable when the first and second signals become equal for operating the punched card reader to cause it to scan a further section of the punched card, said reader re-setting said variable voltage source so that the second signal has a value representing the weight of material in the main container plus the desired weight of the next material to be delivered to the main container, so that the setting of the variable voltage source becomes cumulatively greater as successive sections of the punched card are scanned and the appropriate materials delivered to the main container, a switching device whereby information obtained from a section of the punched card and representing the material required can be converted to information indicating the containers within which the material is stored, said switching device including a plurality of input lines representing the plurality of different materials respectively and energisable in accordance with information on the punched card, a plurality of output lines crossing the input lines but out of contact therewith, the output lines being in series with the discharge relays respectively, and a plurality of connecting pieces associated with the output lines respectively and connectible to any of the input lines, whereby no two input lines can be connected to the same output line, but an input line can be connected to more than one output line if the same material is stored in more than one container, the apparatus further including a conveying system for feeding material from one or more stations to the container or containers in which the material is to be stored, a plurality of intake valves above the containers respectively, a plurality of diodes in series with the output lines whereby signals of one polarity only can be fed to the discharge relays, a plurality of intake relays for operating the intake valves respectively, means operable by signals, of polarity opposite to said one polarity, fed to the output lines by way of the input lines and said connecting pieces, for operating said intake valves, and means including further diodes whereby information fed to the input lines for the purposes of effecting discharge from and intake to said containers consists of signals of said one and said opposite polarity respectively.

3. Apparatus as claimed in claim 2 in which the conveying system includes two minor conveyors extending above a number of containers and each including intake valves through which material can be delivered to the containers, the two minor conveyors being separately operable to deliver material to the containers.

4. Apparatus as claimed in claim 3, and including three major conveyors to which material from three stations can be fed, means for producing positive, negative or alternating signals when said major conveyors are in use respectively, and means operable in part by said signals for transferring material from a major conveyor to the appropriate minor conveyor.

5. Apparatus for dispensing predetermined weights of a plurality of different materials, comprising in combination a plurality of storage containers within which the different materials are stored respectively, a main container to which material from the storage containers can be fed, a plurality of discharge means controlling flow from the storage containers respectively to the main container, electrical weighing means for producing a first signal of magnitude dependent on the weight of material in the main container, a punched card reader capable of scanning sections of a punched card in turn a variable voltage source producing a second signal, means operable by said punched card reader for adjusting said second signal in accordance with information on a section of a punched card being scanned, whereby said second signal represents a desired weight of material, a difference amplifier to which said first signal and said second signal are fed, a master relay energisable by the output from the difference amplifier when the second signal exceeds the first signal, a plurality of discharge relays which when energised operate said discharge means respectively, a normally open contact in series with each of said discharge relays and operable by the master relay, means operable by information on the section of the punched card being scanned for energising a discharge relay through the appropriate contact of the master relay to permit delivery of material from a selected storage container to the main container, delivery terminating when the first and second signals become equal, means operable when the first and second signals become equal for operating the punched card reader to cause it to scan a further section of the punched card, said reader re-setting said variable voltage source so that the second signal has a value representing the weight of material in the main container plus the desired weight of the next material to be delivered to the main container, so that the setting of the variable voltage source becomes cumulatively greater as successive sections of the punched card are scanned and the appropriate materials delivered to the main container.

6. Apparatus as claimed in claim 5 in which said variable voltage source is a transformer the secondary output from which is varied.

7. Apparatus for dispensing predetermined weights of a plurality of different materials, comprising in combination a plurality of storage containers within which the different materials are stored respectively, a main container to which material from the storage containers can be fed, a plurality of discharge means controlling flow from the storage containers respectively to the main container, electrical weighing means for producing a first signal of magnitude dependent on the weight of material in the main container, a punched card reader capable of scanning sections of a punched card in turn, a variable voltage source producing a second signal, means operable by said punched card reader for adjusting said second signal in accordance with information on a section of a punched card being scanned, whereby said second signal represents a desired weight of material, a difference amplifier to which said first signal and said second signal are fed, a master relay energisable by the output from the difference amplifier when the second signal exceeds the first signal, a plurality of discharge relays which when energised operate said discharge means respectively, a normally open contact in series with each of said discharge relays and operable by the master relay, means operable by information on the section of the punched card being scanned for energising a discharge relay through the appropriate contact of the master relay to permit delivery of material from a selected storage container to the main container, delivery terminating when the first and second signals become equal, means operable when the first and second signals become equal for operating the punched card reader to cause it to scan a further section of the punched card, said reader re-setting said variable voltage source so that the second signal has a value representing the weight of material in the main container plus the desired weight of the next material to be delivered to the main container, so that the setting of the variable voltage source becomes cumulatively greater as successive sections of the punched card are scanned and the appropriate materials delivered to the main container, a switching device whereby information obtained from a section of the punched card and representing the material required can be converted to information indicating the containers within which the material is stored.

8. Apparatus for dispensing predetermined weights of a plurality of different materials, comprising in combination a plurality of storage containers within which the different materials are stored respectively, a main container to which material from the storage containers can be fed, a plurality of discharge means controlling flow from the storage containers respectively to the main container, electrical weighing means for producing a first signal of magnitude dependent on the weight of material in the main container, a punched card reader capable of scanning sections of a punched card in turn, a variable voltage source producing a second signal, means operable by said punched card reader for adjusting said second signal in accordance with information on a section of a punched card being scanned, whereby said second signal represents a desired weight of material, a difference amplifier to which said first signal and said second signal are fed, a master relay energisable by the output from the difference amplifier when the second signal exceeds the first signal, a plurality of discharge relays which when energised operate said discharge means respectively, a normally open contact in series with each of said discharge relays and operable by the master relay, means operable by information on the section of the punched card being scanned for energising a discharge relay through the appropriate contact of the master relay to permit delivery of material from a selected storage container to the main container, delivery terminating when the first and second signals become equal, means operable when the first and second signals become equal for operating the punched card reader to cause it to scan a further section of the punched card, said reader re-setting said variable voltage source so that the second signal has a value representing the weight of material in the main container plus the desired weight of the next material to be delivered to the main container, so that the setting of the variable voltage source becomes cumulatively greater as successive sections of the punched card are scanned and the appropriate materials delivered to the main container, a switching device whereby information obtained from a section of the punched card and representing the material required can be converted to information indicating the containers within which the material is stored, said switching device including a plurality of input lines representing the plurality of different materials respectively and energisable in accordance with information on the punched card, a plurality of output lines crossing the input lines but out of contact therewith, the output lines being in series with the discharge relays respectively, and a plurality of connecting pieces associated with the output lines respectively and connectible to any of the input lines, whereby no two input lines can be connected to the same output line, but an input line can be connected to more than one output line if the same material is stored in more than one container.

9. Apparatus for dispensing predetermined weights of a plurality of different materials, comprising in combination a plurality of storage containers within which the different materials are stored respectively, a main container to which material from the storage containers can be fed, a plurality of discharge means controlling flow from the storage containers respectively to the main container, electrical weighing means for producing a first signal of magnitude dependent on the weight of material in the main container, a variable voltage source producing a second signal representing the required weight of a material, a difference amplifier to which said first signal and said second signal are applied, and electrical control means operable by the output from said difference amplifier for controlling opening and closing of the discharge means to successively feed different materials to the main container, said electrical control means automatically adjusting the setting of said variable voltage source after each material is delivered whereby at any time said second signal represents the sum of the weights of material delivered to the main container plus the required weight of the next material to be delivered to the main container.

10. Apparatus for dispensing predetermined weights of a plurality of different materials, comprising in combination a plurality of storage containers within which the different materials are stored respectively, a main container to which material from the storage containers can be fed, a plurality of discharge means controlling flow from the storage containers respectively to the main container, electrical weighing means for producing a first signal of magnitude dependent on the weight of material in the main container, a transformer having a variable secondary output, said transformer producing a second signal representing the required weight of a material a difference amplifier to which said first signal and said second signal are applied, and electrical control means operable by the output from said difference amplifier for controlling opening and closing of the discharge means to successively feed different materials to the main container, said electrical control means automatically adjusting the setting of said transformer secondary after each material is delivered whereby at any time said second signal represents the sum of the weights of material delivered to the main container plus the required weight of the next material to be delivered to the main container.

11. Apparatus for dispensing predetermined weights of a plurality of different materials, comprising in combination a plurality of storage containers within which the different materials are stored respectively, a main container to which material from the storage containers can be fed, a plurality of discharge means controlling flow from the storage containers respectively to the main container, electrical weighing means for producing a first signal of magnitude dependent on the weight of material in the main container, a punched card reader capable of scanning sections of a punched card in turn, a variable voltage source producing a second signal, means operable by said punched card reader for adjusting said second signal in accordance with information on a section of a punched card being scanned, whereby said second signal represents a desired weight of material, a difference amplifier to which said first signal and said second signal are fed, a master relay energisable by the output from the difference amplifier when the second signal exceeds the first signal, a plurality of discharge relays which when energised operate said discharge means respectively, a normally open contact in series with each of said discharge relays and operable by the master relay, means operable by information on the section of the punched card being scanned for energising a discharge relay through the appropriate contact of the master relay to permit delivery of material from a selected storage container to the main container, delivery terminating when the first and second signals become equal, means operable when the first and second signals become equal for operating the punched card reader to cause it to scan a further section of the punched card, said reader re-setting said variable voltage source in accordance with the desired weight of the next material to be delivered to the main container, a switching device whereby information obtained from a section of the punched card and representing the material required can be converted to information indicating the containers within which the material is stored, said switching device including a plurality of input lines representing the plurality of different materials respectively and energisable in accordance with information on the punched card, a plurality of output lines crossing the input lines but out of contact therewith, the output lines being in series with the discharge relays respectively, and a plurality of connecting pieces associated with the output lines respectively and connectible to any of the input lines, whereby no two input lines can be connected to the same output line, but an input line can be connected to more than one output line if the same material is stored in more than one container, the apparatus further including a conveying system for feeding material from one or more stations to the container or containers in which the material is to be stored, a plurality of intake valves above the containers respectively, a plurality of intake relays in series with said output lines for operating the intake valves respectively, a plurality of diodes in series with said output lines whereby signals of one polarity only can be fed to the intake relays, a further plurality of diodes in series with the output lines whereby signals of the opposite polarity only can be fed to said discharge relays, and means including further diodes whereby information fed to the input lines for the purpose of effecting intake to and discharge from said containers, consists of signals of said one and said opposite polarity respectively.

12. Apparatus for dispensing predetermined weights of a plurality of different materials, comprising in combination a plurality of storage containers within which the different materials are stored respectively, a main container to which material from the storage containers can be fed, a plurality of discharge means controlling flow from the storage containers respectively to the main container, electrical weighing means for producing a first signal of magnitude dependent on the weight of material in the main container, a punched card reader capable of scanning sections of a punched card in turn, a variable voltage source producing a second signal, means operable by said punched card reader for adjusting said second signal in accordance with information on a section of a punched card being scanned, whereby said second signal represents a desired weight of material, a difference amplifier to which said first signal and said second signal are fed, a master relay energisable by the output from the difference amplifier when the second signal exceeds the first signal, a plurality of discharge relays which when energised operate said discharge means respectively, a normally open contact in series with each of said discharge relays and operable by the master relay, means operable by information on the section of the punched card being scanned for energising a discharge relay through the appropriate contact of the master relay to permit delivery of material from a selected storage container to the main container, delivery terminating when the first and second signals become equal, means operable when the first and second signals become equal for operating the punched card reader to cause it to scan a further section of the punched card, said reader re-setting said variable voltage source in accordance with the desired weight of the next material to be delivered to the main container, a switching device whereby information obtained from a section of the punched card and representing the material required can be converted to information indicating the containers within which the material is stored, said switching device including a plurality of input lines representing the plurality of different materials respectively and energisable in accordance with information on the punched card, a plurality of output lines crossing the input lines but out of contact therewith, the output lines being in series with the discharge relays respectively, and a plurality of connecting pieces associated with the output lines respectively and connectible to any of the input lines, whereby no two input lines can be connected to the same output line, but an input line can be connected to more than one output line if the same material is stored in more than one container, the apparatus further including a conveying system for feeding material from one or more stations to the container or containers in which the material is to be stored, a plurality of intake valves above the containers respectively, a plurality of diodes in series with the output lines whereby signals of one polarity only can be fed to the discharge relays, a plurality of intake relays for operating the intake valves respectively, means operable by signals, of polarity opposite to said one polarity, fed to the output lines by way of the input lines and said connecting pieces, for operating said intake valves, and means including further diodes whereby information fed to the input lines for the purposes of effecting discharge from and intake to said containers consists of signals of said one and said opposite polarity respectively.

13. Apparatus as claimed in claim 12 in which the conveying system includes two minor conveyors extending above a number of containers and each including intake valves through which material can be delivered to the containers, the two minor conveyors being separately operable to deliver material to the containers.

14. Apparatus as claimed in claim 13 and including three major conveyors to which material from three stations can be fed, means for producing positive, negative or alternating signals when said major conveyors are in use respectively, and means operable in part by said signals for transferring material from a major conveyor to the appropriate minor conveyor.

References Cited by the Examiner

UNITED STATES PATENTS

| | | | |
|---|---|---|---|
| 2,801,819 | 8/1957 | Lindars | 177—70 |
| 3,061,026 | 10/1962 | Hecox et al. | 177—210 |
| 3,076,515 | 2/1963 | Chilton | 177—210 |
| 3,101,801 | 8/1963 | Miller | 177—70 |
| 3,106,974 | 10/1963 | Williams | 177—70 |
| 3,173,504 | 3/1965 | Thorsson et al. | 177—70 |

FOREIGN PATENTS

| | | |
|---|---|---|
| 590,940 | 1/1960 | Canada. |
| 339,392 | 8/1959 | Switzerland. |

LOUIS J. CAPOZI, *Primary Examiner.*

LEO SMILOW, *Examiner.*

R. S. WARD, *Assistant Examiner.*